Patented June 3, 1947

2,421,416

UNITED STATES PATENT OFFICE 2,421,416

CATALYTIC HYDROGENATION OF SUGARS

Leo Aaron Flexser, Elizabeth, N. J., assignor to Hoffman-La Roche, Inc., Roche Park, Nutley, N. J., a corporation of New Jersey No Drawing. Application August 30, 1944, Serial No. 552,003

10 Claims. (Cl. 260—635)

This invention relates to the art of catalytic hydrogenation of sugars, particularly hexoses and pentoses to form polyhydric alcohols.

It is known that the catalytic reduction of sugars to polyhydric alcohols may be accomplished with the aid of various hydrogenation catalysts such as finely divided platinum, palladium, nickel, copper or cobalt as well as alloys and oxides. In using any of these catalysts it is desirable to carry out the reaction under such conditions as to maintain the catalyst at maximum activity and useful life, consistent with obtaining the desired product. For a commercially feasible process, the choice of catalyst is primarily determined by economic considerations. For this reason use of the rather costly noble metals such as palladium and platinum is generally avoided when possible in favor of the cheaper base metals such as nickel, copper or cobalt.

The art has already brought out the fact that in order to obtain a uniform reduction product of the highest purity, it is necessary to provide a method whereby a sugar is reduced at such a low temperature and so quickly that the reaction is completed before any decomposition of the sugar can occur. I have discovered that the addition of magnesium metal to the reaction mixture containing a base metal catalyst quite unexpectedly accomplishes these purposes in a highly satisfactory manner.

The temperature at which these reductions can be carried out may vary over rather wide limits, and the prior art as exemplified by U. S. Patents 1,990,245, 1,963,999 and 2,280,975 discloses temperature ranges of from 100 to 160° C. with times of from 1 to 6 hours as being required.

I find that a solution of glucose in water in the presence of finely divided nickel catalyst and magnesium turnings begins to react with hydrogen at a temperature as low as 50° C. The reaction is very rapid at 75° to 95° C. and may be completed in a few minutes, the limiting factor being the rate at which the hydrogen can be introduced into the solution. The final product is a sorbitol solution of exceptional purity.

The mode of action of the magnesium metal in producing increased catalytic activity is possibly due to the electrolytic cell or couple which arises between the magnesium and the metal catalyst whereby any tendency for the catalyst to be oxidized is avoided because the more active magnesium is preferentially attacked. Nickel and cobalt for example being above hydrogen in the electromotive force series would tend to displace hydrogen from water and become coated with a film of oxide or hydroxide thereby resulting in loss of activity. But when in contact with magnesium metal, such a reaction is avoided and the surface of the catalyst remains fresh and active.

In addition to enhancing the activity of the hydrogenation catalyst, I have found that the addition of magnesium also prolongs its life so that the catalyst may be re-used indefinitely.

The quantity of magnesium metal which must be added to obtain the desired result is not critical, as little as one per cent of the catalyst weight being sufficient. In general the maximum benefit is obtained with about 10% of the catalyst weight of magnesium. Greater amounts than 10% do not proportionately increase catalyst activity although excess of magnesium does no harm. The magnesium may be used in any form such as powder, pellets or turnings. I prefer the use of pellets or turnings as they are easy to handle and not subject to the fire hazard of magnesium powder.

The use of magnesium in hydrogenation of sugars gives the further advantage that introduction of heavy metals into the final product is minimized. Ordinarily when sugars are hydrogenated, acidic decomposition products are formed due to the high temperature and prolonged time of reaction. These acidic products cause partial solution of the catalyst metal and frequently also of the metal of which the autoclave is constructed. These metals must be removed if the hydrogenated product is to be used for pharmaceutical purposes or certain manufacturing processes such as bacterial oxidation. In the presence of magnesium, the reaction is so rapid that the acidic decomposition is negligible and solution of metals is at a minimum. Furthermore, magnesium tends to keep metals from dissolving in any case by virtue of the protective electrolytic couple action previously mentioned. In this way also, corrosion of the metal autoclave is avoided, which is an important consideration in commercial operation.

The following are examples of the application of my invention. They are included merely for purposes of illustration and are not to be regarded as limitations. For instance, it is apparent that the use of magnesium with other hydrogenation metal catalysts and with other substances than sugars will produce similar advantageous results to those mentioned, provided that such substances do not react with magnesium. I also wish it to be understood that pentoses such as ribose, arabinose and xylose may be reduced to their alcohols in the same fashion as the hexoses in accordance with my invention.

Example 1

To a solution of 1.5 kg. glucose in 3.1 liters water containing 150 grams of Raney nickel catalyst are added 15 grams of magnesium metal turnings. The mixture is placed in an autoclave under a hydrogen pressure of about 20 atmospheres and is heated under good agitation to a temperature of 85 to 95° C. Absorption of hydrogen is completed in about 10 minutes but the temperature is kept at this point for 15 minutes longer to insure completeness of reaction. The mixture is then cooled and filtered giving a water-white solution of sorbitol having a pyridine number of about 95, corresponding to a virtually quantitative yield of pure sorbitol.

*Example 2*

To a solution of 1.5 kg. glucose in 3.1 liters water is added the filtered catalyst with magnesium turnings resulting from Example 1. The mixture is hydrogenated as in Example 1 with exactly the same result.

The procedure of Example 2 may be repeated indefinitely, with the same catalyst, it being necessary only to add about 5 g. magnesuim turnings at every tenth batch. Eventually the catalyst becomes poisoned (due to retention therein of the minute amounts of sulfur originally present in the raw materials) and must be used at a higher temperature, say 100 to 125°, and finally must be discarded, after which a new cycle is begun with fresh catalyst and magnesium.

*Example 3*

To a solution of 440 g. d-ribose in 4 liters of water containing also sodium sulfate (said solution resulting from the reduction of d-ribonolactone by sodium amalgam with concomitant neutralization of free alkali by sulfuric acid), were added 50 g. Raney nickel catalyst and 15 g. magnesium metal turnings. The mixture was placed in an autoclave under a hydrogen pressure of about 30 atmospheres and heated under good agitation at 100° C. for 90 minutes. The solution was cooled and filtered. Titration of the solution for residual ribose showed that 97.9% reduction had occurred. Presence of adonitol was demonstrated by re-oxidation with sodium hypochlorite whereupon ribose was regenerated.

*Example 4*

To a solution of 240 g. l-sorbose in 3 liters water were added 25 g. Raney nickel catalyst and 15 g. magnesium metal turnings. The mixture was placed in an autoclave under a hydrogen pressure of about 25 atmospheres and heated under good agitation at 90 to 95° C. for 30 minutes. The solution was cooled and filtered. The product was a water-white solution. The yield was 93% based on reacted sorbose.

What I claim is:

1. The process of catalytically reducing a saccharide which comprises exposing the saccharide in aqueous solution to the action of hydrogen with agitation and heat in the presence of a base metal hydrogenation catalyst and of metallic magnesium in discrete particulate form.

2. The process of catalytically reducing a hexose which comprises exposing the hexose in aqueous solution to the action of hydrogen with agitation under pressure above atmospheric pressure and heat in the presence of a base metal hydrogenation catalyst and of metallic magnesium in discrete particulate form.

3. The process of catalytically reducing glucose to sorbitol which comprises exposing glucose in aqueous solution to the action of hydrogen with agitation under pressure above atmospheric pressure and heat in the presence of a base metal hydrogenation catalyst and of metallic magnesium in discrete particulate form.

4. The process of catalytically reducing a pentose which comprises exposing the pentose in aqueous solution to the action of hydrogen with agitation under pressure above atmospheric pressure and heat in the presence of a base metal hydrogenation catalyst and of metallic magnesium in discrete particulate form.

5. The process of catalytically reducing ribose to adonitol which comprises exposing the ribose in aqueous solution to the action of hydrogen with agitation under pressure above atmospheric pressure and heat in the presence of a base metal hydrogenation catalyst and of metallic magnesium in discrete particulate form.

6. The process of catalytically reducing a hexose which comprises exposing the hexose in aqueous solution to the action of hydrogen with lively agitation under pressure above atmospheric pressure and at a temperature at which rapid absorption of hydrogen occurs in the presence of nickel catalyst and of about 10% of the catalyst weight of metallic magnesium in discrete particulate form.

7. The process of catalytically reducing glucose to sorbitol which comprises exposing the glucose in aqueous solution to the action of hydrogen with lively agitation under pressure and at a temperature of from about 50 to about 125° C. in the presence of nickel catalyst and of about 10% of the catalyst weight of metallic magnesium in discrete particulate form.

8. The process of catalytically reducing glucose to sorbitol which comprises exposing the glucose in aqueous solution to the action of hydrogen with lively agitation under a pressure of about 20 atmospheres and with heating to a temperature of from about 85 to about 105° C. in the presence of Raney nickel catalyst and of 10% of the catalyst weight of magnesium metal turnings.

9. The process of catalytically reducing ribose to adonitol which comprises exposing the ribose in aqueous solution to the action of hydrogen with lively agitation under a pressure of about 30 atmospheres and with heating to a temperature of from 90 to 110° C. in the presence of Raney nickel catalyst and of 10% of the catalyst weight of magnesium metal turnings.

10. The process of catalytically reducing sorbose which comprises exposing the sorbose in aqueous solution to the action of hydrogen with lively agitation under a pressure of about 25 atmospheres and with heating to a temperature of from 85 to 105° C. in the presence of Raney nickel catalyst and of 10% of the catalyst weight of magnesium metal turnings.

LEO AARON FLEXSER.

REFERENCES CITED

The following references are of record in the file of this patent:

UNITED STATES PATENTS

| Number | Name | Date |
|---|---|---|
| 2,292,293 | Rose | Aug. 4, 1942 |
| 2,325,207 | Stengel et al. | July 27, 1943 |
| 2,328,140 | Hahn | Aug. 31, 1943 |

FOREIGN PATENTS

| Number | Country | Date |
|---|---|---|
| 408,811 | Germany | Jan. 24, 1925 |